United States Patent Office 3,242,153
Patented Mar. 22, 1966

3,242,153
SYNDIOTACTIC POLYMERS
Günter Schröder and Friedrich Götzen, Darmstadt, Germany, assignors to Rohm & Haas G.m.b.H., Darmstadt, Germany
No Drawing. Filed Nov. 26, 1962, Ser. No. 240,145
Claims priority, application Germany, Nov. 27, 1961, R 31,545
13 Claims. (Cl. 260—89.7)

This invention relates to improved methods of making syndiotactic polymers, and to the polymers produced thereby.

German patent publication 1,106,077, the teachings of which are incorporated herein by reference, describes methods for producing polymers of methylmethacrylate which, because of their predominantly isotactic or syndiotactic structure, are crystallizable. For example, by photopolymerization of methylmethacrylate between 0° and −75° in the presence of a free radical forming catalyst, a predominantly syndiotactic polymer is obtained. A further method for the preparation of predominantly syndiotactic polymethylmethacrylate involves anionic polymerization at temperatures below −40° C. in a polar medium, for example in glycol dimethyl ether or liquid ammonia. When anionic polymerization is effected in a non-polar solvent, for example toluene, isotactic polymers are principally formed. The teachings of the German publication are incorporated herein by reference as representative of the prior art relating to the synthesis of syndiotactic polymers by anionic polymerization.

The polymethylmethacrylate common in commerce shows about 60 to 80% of syndiotactic portions [determined according to the method of Baumann, Schrieber, and Tessmar, "IR-Spektroskopische Untersuchungen zur Taktizität von Polymethylmethacrylat," Die makromolekulare Chemie, volume 36, No. 1, pages 81–85 (1959)]. This percentage can be considerably increased by the photopolymerization mentioned above. Nevertheless, the method is not adapted to commercial use in view of the low temperatures, the long reaction period, the low yield, and the low molecular weight of the product obtained.

The known anionic methods proceeding in a polar medium lead to a polymer having a syndiotactic portion which is greater than that shown by the common commercial atactic polymers, but is below that which can be achieved by photopolymerization at low temperatures. The anionic polymerization process further has the disadvantage that it only leads to the desired stereo-specific polymers at temperatures below −40° C. Also, in organic solvents, only soluble polymers have been obtained heretofore according to this method.

It has now been found that the syndiotactic portion of a polymer prepared by anionic polymerization from an ester or di-substituted amide of acrylic or methacrylic acid can be increased if at least one mol of such a co-catalyst is added, per mol of the catalyst, as comprises an organic compound containing either an amine oxide group ($R_3N^+$—$O^-$), a sulfoxide group, or at least one of the following groups:

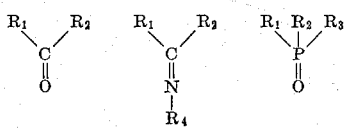

In these formulas, at least one of the groups $R_1$, $R_2$, or $R_3$ is either

whereas the remaining radicals $R_1$, $R_2$, $R_3$, $R_4$, and $R_5$ are alkyl, cycloalkyl, or aralkyl, which may be the same or different and which may belong to one or more ring systems, and wherein $R_1$, $R_2$, and $R_3$ may also be hydrogen. The catalysts thus include, but are not necessarily limited to, materials such as lower dialkyl sulfoxides, amides of lower alkanoic acids and lower di-alkyl amines, as well as N-alkyl lactams of lower amino carboxylic acids, amides of phosphoric acid with lower di-alkyl amines, cyclic diesters of carbonic acid such as ethylene carbonate, cyclic amino-imides, and the like. These co-catalysts are dipolar aprotic solvents in the sense discussed in the article by Parker in Quarterly Reviews, 16, 163 (1962). Compounds of this type are, for example, hexamethyl phosphoric acid triamide, N-methylimidazol, ethylene carbonate (dimethylene carbonate), N-methylpyrrolidone, dimethyl sulfoxide, dimethyl formamide and acetamide, pyridine oxide, and N,N'-dimethyl-ethylene urea.

With these co-catalysts are suitably used the metal organic compounds, usually alkali metal hydrocarbons, e.g., alkyls, aryls, aralkyls, and cycloalkyls, conventional as catalysts in anionic polymerization, such as butyl lithium, fluorenyl lithium, amyl sodium, triphenylmethyl sodium or triphenylmethyl potassium, etc. Grignard reagents such as alkyl and aryl magnesium bromides may also be used as catalysts. According to the invention the co-catalyst can be employed in known anionic processes, such as those which employ alkali- or alkaline earth metals or metal organic compounds of these metals as catalysts.

The polymerization is suitably performed in a solvent inert to the anionic initiator. For example, suitable organic materials include aliphatic hydrocarbons such as gasoline fractions, aromatic hydrocarbons such as benzene, toluene and the like, and ethers such as diethyl ether, tetrahydrofuran, glycol dimethyl ether, etc. Other suitable solvents will be evident to the skilled polymer chemist.

The syndiotactic portion of the polymer obtained according to the invention is in each case suddenly increased. That is, in anionic processes in solvents which heretofore gave a predominantly isotactic product, the use of a co-catalyst gives polymers with over 50% of syndiotactic portions. If the co-catalyst is used in anionic polymerization processes proceeding in solvents which per se lead to predominantly syndiotactic polymers, by the new process a pure or practically pure syndiotactic polymer can be prepared.

According to known anionic processes, polymers can be produced which are up to 90 to 95% syndiotactic (determined by the method of Baumann et al., op. cit.), and which correspond with an absolute measurement of 92% determined by nuclear magnetic resonance spectra. According to the present invention, this absolute percentage can be raised to from 98 to about 100%, corresponding with a value of 105–106% as determined by the method of Baumann et al.

A significant improvement of the mechanical properties of the polymer, because of the greater regularity of its structure and the greater stiffness of the molecule, is linked with the increased or pure syndiotacticity. For example the resistance to deformation by heat, measured according to Vicat, can be raised from the 120°–125° value formerly characteristic of a syndiotactic polymethylmethacrylate, to 135°–140° C. Similarly, an improvement in resistance to solvents, as well as in the crystallizability of the polymer, can be recognized.

A further technical improvement of the process lies in the fact that the preparation of predominantly syndiotactic precipitation polymers in organic solvents is made possible, whereas previously only syndiotactic solution polymers, which are less convenient to handle than the precipitation polymers, could be prepared. Further, it is to be noted that the addition of the co-catalysts claimed herein not only increases syndiotacticity, but simultaneously desirably increases molecular weight.

The amount of co-catalyst employed should be at least one mol per mol of the principal catalyst. It has proved especially suitable to use from 1 to 10 mols of co-catalyst per mol of the catalyst. The co-catalyst can serve also as the sole solvent medium.

The new process has the further advantage that the polymerization need not be carried out at temperatures below −40° C., as in conventional anionic processes, but can in many cases be simply performed at room temperature. The reactions are suitably performed under anhydrous conditions in the presence of an atmosphere inert to the reactants and catalysts.

According to the process of the invention, it is possible, by a selection of specific reaction conditions and co-catalysts, to prepare polymers having very exact ratios between their syndiotactic and isotactic portions, as may be desired for specific end uses.

In the following examples, given by way of illustration, the performance of the process and its advantageous effect on polymer properties is made more evident.

*Example 1*

250 ml. of tetrahydrofuran, previously distilled for 3 hours over $CaH_2$ and then dried over basic $Al_2O_3$ (Woelm), were placed in a reaction vessel well flushed with nitrogen. 2.08 gms. of fluorene were dissolved therein. To this solution, 2.08 ml. of a 6 N solution of butyl lithium in petroleum ether were added dropwise with stirring. After two hours of stirring at room temperature, the solution was cooled to −70° C. Then, 26.4 ml. of methylmethacrylate, previously dried over basic $Al_2O_3$, were added rapidly. The temperature rose to 15° C. and the viscosity of the solution increased. After 15 hours, the polymerization was interrupted by the addition of acetic acid, and the polymethylmethacrylate was precipitated in petroleum ether. The yield, after vacuum filtration and drying at 40° C. in vacuum, was 24.3 gms. (97% of theory). After a treatment with methanol containing hydrochloric acid, the yield of pure ash-free polymer was 13.7 gms. (55% of theory) having a specific viscosity in benzene of 0.007. The tacticity of the polymethylmethacrylate was determined according to the method described by Baumann et al., op. cit., page 81, and amounted to 92 percent syndiotactic portions. This corresponds with a J-value of 113, determined according to Goode, Owens, Fellmann, Snyder, and Moore, Journal of Polymer Science, 46, 317–331 (1960).

*Example 2a*

An experiment was carried out as in Example 1. However, to the solution of the catalyst cooled to −70°, 11.4 gms. of hexamethyl phosphoric acid triamide were added as a co-catalyst before the addition of the methylmethacrylate. The yield, after treatment with methanol containing HCl, was 21 gms. (84% of theory). The tacticity amounted to 104% of syndiotactic portions, corresponding to J-value of about 120. The specific viscosity in benzene was 0.0365.

*Example 2b*

An experiment was carried out as in Example 1, using 6.18 gms. of N-methyl pyrrolidone as a co-catalyst. The yield after treatment with acidified methanol was 22 gms. (88% of theory). The tacticity amounted to 105% of syndiotactic portions and the specific viscosity in benzene was 0.049.

*Example 2c*

215 ml. of tetrahydrofuran (previously distilled over $CaH_2$ for three hours and then dried over basic $Al_2O_3$) was placed in a reaction vessel well flushed with nitrogen. 2.08 gms. of fluorene were dissolved therein. 2.08 ml. of a 6 N solution of butyl lithium in petroleum ether were added to this solution dropwise with stirring. After 2 hours of stirring at room temperature, the solution was cooled to −70°. Finally, a mixture of 26.4 ml. of methylmethacrylate, previously dried over basic $Al_2O_3$, and 4.88 gms. of dimethyl sulfoxide as co-catalyst were quickly added. The temperature rose to 15° C. and the viscosity of the solution increased. After 15 hours, the polymerization was interrupted by the addition of acetic acid, and the polymethylmethacrylate was precipitated with petroleum ether. After vacuum filtering and drying at 40° in vacuum, the yield was 24 gms. (96% of theory). After treatment with a solution of methanol containing hydrochloric acid, 20.6 gms. (82.5% of theory) of pure ash free polymer were obtained. The tacticity amounted to 98% of syndiotactic portions.

*Example 2d*

An experiment was carried out as in Example 2c, using 5.5 gms. of dimethylene carbonate as a co-catalyst. After treatment with acidified methanol, the yield of pure ash free polymer was 21 gms. (84% of theory). The tacticity amounted to 98% of syndiotactic portions.

*Example 2e*

An experiment as described in Example 2c was performed using 5.44 gms. of N,N-dimethyl acetamide as the co-catalyst. After treatment with acidified methanol, the yield of pure ash free polymer was 19.7 gms. (79% of theory). The tacticity of the polymer amounted to 99% of syndiotactic portions.

*Example 3*

Fluorenyl-lithium was prepared from fluorene and butyl lithium in diethyl ether. The activity was determined by titration according to the method of Gilman and Haubein, J. Am. Chem. Soc., 66, 1515–1516 (1944).

Glycol dimethyl ether was distilled over $CaH_2$ for 3 hours and then dried over basic $Al_2O_3$. 250 ml. of the glycol dimethyl ether and 17.85 ml. of a 0.7 N ethereal fluoroenyl-lithium solution were combined in a reaction vessel well flushed with nitrogen. After the solution was cooled to −70° C., 26.4 ml. of methylmethacrylate, previously dried over basic $Al_2O_3$, were added dropwise with stirring within a period of 20 minutes. In this process, the temperature rose to 6° C. and the viscosity of the solution increased. After 15 hours, the polymerization was interrupted by the addition of acetic acid and the solution was poured with stirring into petroleum ether. The precipitated polymethylmethacrylate was separated by vacuum filtration, washed with aqueous HCl, and reprecipitated from tetrahydrofuran-petroleum ether, vacuum filtered, and dried at 40° C. in vacuum. The yield in pure ash free polymer was 24.8 gms. (99% of theory). The tacticity amounted to 90% of syndiotactic portions and the resistance to deformation by heat according to Vicat was 120° C.

*Example 3a*

Glycol dimethyl ether was distilled over $CaH_2$ for 3 hours and then dried over basic $Al_2O_3$. In an apparatus well flushed with nitrogen, 250 ml. of glycol dimethyl ether, 26.4 ml. methylmethacrylate (previously dried over basic Al₂O₃), and 2.23 gms. of hexamethyl phosphoric acid triamide as a co-catalyst were combined. This solution was cooled to −70°. On the subsequent dropwise addition of 17.85 ml. of a 0.7 N ethereal fluorenyl lithium solution, the temperature rose to 6° C. and the viscosity of the solution increased. After 15 hours, the polymerization was interrupted by the addition of acetic acid, and the polymethylmethacrylate was precipitated in petroleum ether. The dried polymer was treated with methanol containing hydrochloric acid, vacuum filtered, and dried at 40° C. in vacuum. The yield in pure ash free polymer was 24.7 gms. (99% of theory). The tacticity amounted to 106% of syndiotactic portions and the resistance to deformation by heat according to Vicat was 137° C.

*Example 3b*

An experiment was performed as in Example 3a using 1.25 gms. of N-methyl pyrrolidone as a co-catalyst. The yield of pure ash free polymer was 24.4 gms. (98.5% of theory). The tacticity of the polymer amounted to 104% of syndiotactic portions, and the specific viscosity in benzene was 0.0250.

*Example 4*

Diethyl ether was distilled over CaH₂ for 3 hours and then dried over basic Al₂O₃. In an apparatus well flushed with nitrogen, 250 ml. of diethyl ether and 17.85 ml. of a 0.7 N ethereal fluorenyl-lithium solution were combined. This solution was cooled to −70° C. Within a period of 20 minutes, 26.4 ml. of methylmethacrylate (previously dried over basic Al₂O₃) were added dropwise with stirring, whereby a white precipitate was formed and the temperature rose to 6° C. After 15 hours the polymerization was interrupted with acetic acid, the polymer was vacuum filtered, stirred with acidified methanol, washed with neutral methanol, and dried at 30° C. in vacuum. 23 gms. (92% of theory) of pure ash free polymer were obtained. The tacticity amounted to about 12% of syndiotactic portions and the specific viscosity in benzene was 0.0097.

*Example 4a*

Diethyl ether was distilled for 3 hours over CaH₂ and then dried over basic Al₂O₃. 250 ml. of diethyl ether, 8.9 ml. of a 0.7 N ethereal fluorenyl-lithium solution, and 5.7 gms. of hexamethyl phosphoric acid triamide as a co-catalyst were combined in an apparatus well flushed with nitrogen. This solution was cooled to −70° C. Over a period of 20 minutes, 26.4 ml. of methylmethacrylate (previously dried over basic Al₂O₃) were added dropwise with stirring, whereby a white precipitate formed, and the temperature rose to 6° C. After 15 hours, the polymerization was interrupted with acetic acid, the polymer was vacuum filtered, stirred with water containing HCl, washed to a neutral condition with methanol, vacuum filtered, and dried at 40° C. in vacuum. The polymer obtained had a tacticity of 90% syndiotactic portions.

*Example 5*

In an apparatus well flushed with nitrogen, 1 ml. of a 6 N butyl-lithium solution (in petroleum ether) were combined with 250 ml. of heptane (dried over basic Al₂O₃). After the solution had been cooled to 0° C., 26.4 ml. of methylmethacrylate (dried over basic Al₂O₃) were added dropwise over a period of 10 minutes. Increase in temperature amounted to 5° C. After 3 hours, the polymerization was interrupted with acetic acid. The precipitated polymer was vacuum filtered, treated with methanol containing hydrochloric acid, vacuum filtered again, and dried at 40° C. in vacuum. The polymer obtained had a tacticity comprising 16% of syndiotactic portions.

*Example 5a*

The experiment described in Example 5 was repeated, only using 5.6 gms. of hexamethyl phosphoric acid triamide as the co-catalyst. The polymer obtained had a tacticity of 72% syndiotactic portions.

*Example 6*

250 ml. toluene and 26.4 ml. methylmethacrylate (both previously dried over basic Al₂O₃) were combined in a reaction vessel well flushed with nitrogen. The solution was cooled to −70° C., and 2.08 ml. of a 6 N solution of butyl-lithium in petroleum ether were added with stirring within a period of 5 minutes. The temperature rose to 6° C., and the viscosity of the solution increased. After 4 hours, the polymerization was interrupted with acetic acid and the polymethylmethacrylate precipitated in petroleum ether, vacuum filtered, and dried. After treating with methanol containing hydrochloric acid and drying at 40° C. in vacuum, the yield in pure ash free polymer was 22 gms. (88% of theory). The tacticity amounted to 13% of syndiotactic portions and the specific viscosity in benzene was 0.0455.

*Example 6a*

250 ml. toluene, 26.4 ml. methylmethacrylate (both previously dried over basic Al₂O₃), and 5.7 gms. of hexamethyl phosphoric acid triamide as co-catalyst were combined in a reaction vessel well flushed with nitrogen. This solution was cooled to −70° C. and 1.04 ml. of a 6 N solution of butyl-lithium in petroleum ether were added within a period of 5 minutes. The temperature rose to 6°, and the viscosity of the solution increased. After 4 hours, the polymerization was interrupted with acetic acid, and the polymethylmethacrylate precipitated in petroleum ether, vacuum filtered, and dried. After treating with methanol containing hydrochloric acid and drying at 40° C. in vacuum, the yield in pure ash free polymer was 21.4 gms. (86% of theory). The tacticity amounted to 82% of syndiotactic portions and the specific viscosity in benzene was 0.0870.

*Example 7*

In a reaction vessel well flushed with nitrogen were placed 250 ml. of toluene previously dried over basic Al₂O₃. Fluorene (2.08 gms.) was dissolved therein, and 2.8 ml. of a 6 N-butyl-lithium solution in petroleum ether were added with stirring. After 2 hours stirring, 26.4 ml. methylmethacrylate (previously dried over basic Al₂O₃) were quickly added. The temperature rose to 10° C. and the viscosity of the solution increased. After 15 hours, the polymerization was interrupted with acetic acid, and the polymethylmethacrylate was precipitated with petroleum ether. The precipitated polymer was vacuum filtered, treated with methanol containing hydrochloric acid, vacuum filtered, and dried at 40° C. in vacuum. The polymer obtained had a tacticity amounting to 10% of syndiotactic portions.

*Example 7a*

The experiment of Example 7 was repeated using 11.4 gms. of hexamethyl phosphoric acid triamide as the co-catalyst. The polymer obtained had a tacticity of 65% of syndiotactic portions.

*Example 8*

In a reaction vessel well flushed with nitrogen were placed 250 ml. of toluene (previously dried over basic Al₂O₃) and 5.5 ml. of an ether solution of phenyl magnesium bromide. 25 gms. of methylmethacrylate, previously dried over basic Al₂O₃ were added at once at room temperature with stirring. The temperature rose to 15° C. and the viscosity of the solution increased. After 18 hours the reaction was interrupted with acetic acid. The polymethylmethacrylate product was precipitated in petroleum ether. The yield amounted to 14.2 gms. (57% of theory). The specific viscosity of the polymer in chloroform was 0.108. The tacticity of the polymethylmethacrylate amounted to 3% of syndiotactic portions.

*Example 8a*

200 ml. of toluene dried over basic $Al_2O_3$ were placed in a reaction vessel flushed with nitrogen and 26.5 ml. of methylmethacrylate, also previously dried, were added. 50 ml. of toluene and 12.5 millimols of ether solution of tert. butyl magnesium bromide were placed in a dropping funnel connected with the apparatus, and 4 ml. of hexamethyl phosphoric acid triamide were slowly added dropwise under a light stream of nitrogen. After the toluene and methylmethacrylate in the reaction vessel were cooled to $-75°$ C., the catalyst present in the dropping funnel was added at once. The temperature rose to 10° C. and the viscosity of the solution increased. After 18 hours the polymerization was interrupted with acetic acid and the polymethylmethacrylate was precipitated in petroleum ether. The gross yield after vacuum filtration and drying at 60° was 25 gms. or 100% of theory.

After a 24 hour treatment with hydrochloric acid in methanol, the yield of pure ash free polymer was 21.8 gms. (87% of theory) having a specific viscosity of 0.153. The tacticity of the polymethylmethacrylate amounted to 111% of syndiotactic portions.

Further corresponding experiments were carried out at $-50°$ C., $-40°$ C., $-30°$ C., $-20°$ C., $+3°$ C., and $+30°$ C. The results are tabulated below.

TABLE I

| Temperature | Yield in percent | | $\eta_{sp}/c(CHCl_3)$ | Percent of syndiotactic portions |
|---|---|---|---|---|
| | Gross | Pure | | |
| $-75°$ | 100 | 87 | 0.153 | 111 |
| $-50°$ | 100 | 94 | 0.03 | 103 |
| $-40°$ | 100 | 96 | 0.120 | 100 |
| $-30°$ | 100 | 85 | 0.05 | 95 |
| $-20°$ | 100 | 87 | 0.033 | 93 |
| $+3°$ | 100 | 66 | 0.036 | 81 |
| $+30°$ | 71 | 63 | 0.055 | 51 |

*Example 9*

250 ml. of toluene, previously dried over basic $Al_2O_3$ and 7.25 ml. of an ether solution of phenyl magnesium bromide (14.5 millimols) were placed in a vessel well flushed with nitrogen, and were cooled to $-75°$ C. with stirring. To this solution, 25 gms. of methylacrylate, dried over basic $Al_2O_3$ were quickly added. The temperature rose to 10° C. After 18 hours, the polymerization was interrupted with acetic acid. By pouring the reaction solution into petroleum ether only a small amount of a very low molecular weight polymethylacrylate was isolated.

*Example 9a*

The experiment as described in Example 9 was repeated, only 5.2 gms. of hexamethyl phosphoric acid triamide were additionally present as a co-catalyst. 5.2 gms. (20.8% of theory) of polymethylacrylate having a specific viscosity of 0.022 in dimethyl formamide were obtained.

*Example 10*

200 ml. of toluene (previously dried over basic $Al_2O_3$) and 4.35 ml. (8.7 millimols) of an ether solution of phenyl magnesium bromide were placed in a reaction vessel well flushed with nitrogen, and were cooled to $-70°$ C. with stirring. To this solution, 20 gms. of isopropyl acrylate were quickly added. The temperature rose to 9° C. and the viscosity of the solution increased. After 18 hours, the reaction was interrupted with acetic acid and the polyisopropyl acrylate was precipitated with petroleum ether. The yield amounted to 16 gms. (80% of theory). The polymer had a specific viscosity (in dimethyl formamide) of 0.021.

*Example 10a*

The experiment in Example 10 was repeated, but with 3.13 gms. of hexamethyl phosphoric acid triamide added as a co-catalyst to the catalyst before addition of the isopropyl acrylate. The yield of polymer obtained was 6.8 gms. (34% of theory). The polymer had a specific viscosity (in dimethyl formamide) of 0.035. Both polymers were crystallized by treatment with acetone. The X-ray diffraction patterns of the polymers were different.

*Example 11*

200 ml. of toluene, previously dried over basic $Al_2O_3$ and 5 ml. of an ether solution of phenyl magnesium bromide (10 millimols) were added to a reaction vessel well flushed with nitrogen, and were cooled to $-75°$ C. with stirring. To this solution, 20 gms. of acrylic acid dimethyl amide were quickly added. The temperature rose to 43° C. and the viscosity of the solution rapidly increased. After 18 hours, the reaction was interrupted with acetic acid and the polyacrylic acid dimethyl amide was precipitated with petroleum ether. The yield was 17.5 gms. (87.5% of theory). The specific viscosity (in dimethyl formamide) was 0.045.

*Example 11a*

The experiment of Example 11 was repeated except that 3.58 gms. of hexamethyl phosphoric acid triamide as co-catalyst were added to the catalyst solution before the addition of acrylic acid dimethyl amide. The yield amounted to 20 gms. (100% of theory). The specific viscosity of the polymer (in dimethyl formamide) was 0.089.

What is claimed is:

1. In a process for preparing a polymer by anionically polymerizing a member of the group consisting of esters and di-substituted amides of acrylic and methacrylic acids in the presence of a metal organic compound selected from the group consisting of Grignard reagents and alkali metal hydrocarbons as a catalyst, the improvement of increasing the syndiotactic portion of the polymer by polymerizing in the presence of at least one mol, per mole of catalyst, of a co-catalyst selected from the group consisting of amine oxides, organic sulfoxides, and compounds of the formulae

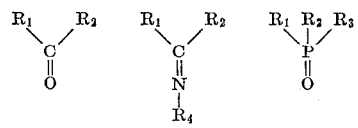

wherein at least one of the radicals $R_1$, $R_2$, and $R_3$ is selected from the group consisting of $-O-R_4$ and

wherein $R_4$ and $R_5$ are selected from the group consisting of alkyl, cycloalkyl, and aralkyl, the remaining radicals $R_1$, $R_2$, and $R_3$ being selected from the group consisting of hydrogen, alkyl, cycloalkyl, and aralkyl, and wherein said radicals $R_1$, $R_2$, $R_3$, $R_4$, and $R_5$ may form at least one ring with each other and the atoms to which they are attached.

2. A process as in claim 1 wherein said co-catalyst is an amine oxide.

3. A process as in claim 1 wherein said co-catalyst is a lower dialkyl sulfoxide.

4. A process as in claim 1 wherein said co-catalyst is an amide formed between a lower alkanoic acid and a lower dialkyl amine.

5. A process as in claim 1 wherein said co-catalyst is an N-alkyl lactam of a lower amino carboxylic acid.

6. A process as in claim 1 wherein said co-catalyst is an amide formed between phosphoric acid and a lower dialkyl amine.

7. A process as in claim 1 wherein said co-catalyst is a cyclic diester of a carbonic acid.

8. A process as in claim 1 wherein said co-catalyst is a cyclic amino-imide.

9. A process as in claim 1 wherein said co-catalyst is hexamethyl phosphoric acid triamide.

10. A process as in claim 1 wherein said co-catalyst is N-methyl pyrrolidone.

11. A process as in claim 1 wherein said co-catalyst is dimethyl sulfoxide.

12. A process as in claim 1 wherein said co-catalyst is ethylene carbonate.

13. A process as in claim 1 wherein said co-catalyst is N,N-dimethyl acetamide.

References Cited by the Examiner
UNITED STATES PATENTS

| | | | |
|---|---|---|---|
| 2,978,503 | 4/1961 | Klager | 260—89.7 |
| 3,027,359 | 3/1962 | Jurgeleit | 260—89.7 |
| 3,029,221 | 4/1962 | Welch | 260—89.5 |
| 3,100,761 | 8/1963 | Fellman et al. | 260—89.5 |

JOSEPH L. SCHOFER, *Primary Examiner.*

LEON J. BERCOVITZ, *Examiner.*